US005185115A

United States Patent [19]

Thole

[11] Patent Number: 5,185,115

[45] Date of Patent: Feb. 9, 1993

[54] FLAT EXTRUSION METHOD FOR MANUFACTURING INORGANICALLY OR ORGANICALLY BONDED WOODED MATERIALS, ESPECIALLY MULTILAYER PANELS

[75] Inventor: Volker Thole, Braunschweig, Fed. Rep. of Germany

[73] Assignee: Fraunhofer-Gesellschaft zur Forderung der Angewandten Forschung e.V., Munich, Fed. Rep. of Germany

[21] Appl. No.: 679,036

[22] PCT Filed: Sep. 15, 1990

[86] PCT No.: PCT/DE90/00709

§ 371 Date: Jun. 13, 1991

§ 102(e) Date: Jun. 13, 1991

[87] PCT Pub. No.: WO91/04142

PCT Pub. Date: Apr. 4, 1991

[30] Foreign Application Priority Data

Sep. 15. 1989 [DE] Fed. Rep. of Germany ....... 3930840

[51] Int. Cl.[5] ........................ B32B 21/02; D04H 1/70

[52] U.S. Cl. .................................... 264/113; 264/109; 264/120; 425/335; 425/371; 425/372

[58] Field of Search ............... 264/109, 112, 113, 119, 264/120; 425/335, 338, 371, 372

[56] References Cited

U.S. PATENT DOCUMENTS

| | | | |
|---|---|---|---|
| 2,728,939 | 1/1956 | Behr . | |
| 3,216,059 | 11/1965 | Voelskow . | |
| 4,216,179 | 8/1980 | Lamberts et al. | 264/25 |
| 4,923,656 | 5/1990 | Held | 264/70 |

FOREIGN PATENT DOCUMENTS

| | | | |
|---|---|---|---|
| 350674 | 3/1922 | Fed. Rep. of Germany . | |
| 2253648 | 7/1973 | Fed. Rep. of Germany . | |
| 2298430 | 8/1976 | France . | |
| 142089 | 11/1930 | Switzerland . | |
| 424733 | 1/1975 | U.S.S.R. | 264/113 |

*Primary Examiner*—Mary Lynn Theisen
*Attorney, Agent, or Firm*—Weingarten, Schurgin, Gagnebin & Hayes

[57] ABSTRACT

A flat extrusion method for manufacturing especially multilayer panels and a device for working the method. The method consists of the following method steps: simultaneous addition of mixtures by mixing and spreading devices (1) into a perpendicular conically tapered shaft (A, B) formed by circulating compression belts (13, 14); compression of the mixture by the conical design of shaft (B), followed by traversing a section (C) in which the compression belts are arranged parallel to one another and at a distance which corresponds to the thickness of the finished panel strand; curing of the mixture in the downstream calibrating section (3).

18 Claims, 6 Drawing Sheets

FLAT EXTRUSION METHOD FOR MANUFACTURING INORGANICALLY OR ORGANICALLY BONDED WOODED MATERIALS, ESPECIALLY MULTILAYER PANELS

FIELD OF THE INVENTION

The invention relates to a method and apparatus for manufacturing inorganically or organically bonded wooden materials.

BACKGROUND OF THE INVENTION

Continuous methods and devices for manufacturing materials from substances containing cellulose, and/or lignocellulose, with the addition of binders are known. Typically, a mixture of particles, binders, and additives is spread on a horizontal belt which is moving at a suitable speed, and the mixture is then compressed. For example, Siempelkamp-Contiroll presses and Küsters compresses work on this principle. In this flat extrusion method, the pressure compressing the fleece acts perpendicularly to the plane of the panel. Manufacture of chipboard by this method proceeds continuously. The spreading and mixing stations required to produce multilayered panels are arranged sequentially. After compression, when gypsum binders are used, a panel must remain in the calibrating press until hydration is largely complete. The specific hydration conditions in gypsum binders cause hydration to begin when the water of hydration is added. The start of hydration and the total hydration time are closely linked. The ratio is approximately such that the total hydration time is three times as long as the time before stiffening begins. Consequently, a faster start of hydration also means the shorter hydration time. The length of a retaining unit, i.e., a calibrating press, required to obtain the dimensions of the panels to be bonded, is therefore a function of the total hydration time and is directly linked to the start of hydration. The earlier hydration can begin, the shorter the calibration press can be made or similarly the higher the feed rate that can be selected. When spreading stations are arranged sequentially, limits are imposed on the rapid start of hydration for design reasons. In other words, when hydration begins later, total hydration lasts longer, and the calibration unit must also be made longer. Ordinary press lengths are approximately 50 m. This length is disadvantageous.

In addition to this continuous flat extrusion method, extrusion methods are known in which the pressure is exerted parallel to the plane of the panel in such fashion that the wood chips are pressed continuously by a heated strand or channel with a rectangular or differently-shaped section producing the chipboard. This method is the so-called Okal method. In this method the chips are metered and fed into a perpendicular compression channel and compressed by a cyclically operating piston. The chips thus compressed migrate through a heated molding channel whose length is set so that the chips are glued sufficiently firmly. Pressing times are relatively short, since the development of heat causes the chips to be glued together at the surface. The resultant strength makes it possible for the binding process not to have to proceed to the middle of the panel while the panel is within the press. The quantity of heat stored at the surface of the panel is sufficient to cause the panel to be bonded all the way to the core of the panel after leaving the press. In this method, despite the relatively short pressing times, there are the disadvantages that an additional device, a punch, must be used; that the friction between the lining of the channel and the fleece reaches levels many times higher than desirable; and that the orientation of the chips of the panels produced by the Okal method runs perpendicular to the plane of the panel, resulting in limited bending strengths of the panels thus produced. This is highly disadvantageous.

SUMMARY OF THE INVENTION

The invention relates to a process for producing panels having a high bending strength to the species and a device for working the process in such fashion that the device is very compact and short.

The use of a relatively short calibrating press in the present invention is made possible by the fact that the mixing and spreading assemblies are arranged parallel to or above one another so that the mixtures required for manufacturing the panels are spread in synchronization. This means that, in contrast to a sequential arrangement, especially when manufacturing multilayer panels, hydration can begin simultaneously for all he layers. In the case of inorganic binders, especially gypsum, hydration begins when the water of hydration is added. If hydration begins soon after addition of all the necessary mixtures, for example, when manufacturing multilayer panels of different components, it will also end sooner. The hydration process has direct effects on the conduct of the process. That is, either the downstream calibrating press can be made much shorter or the feed rate can be made higher. The efficiency of such a method is very high. The high bending strength of the chipboard thus produced is achieved according to the present invention by virtue of the fact that the compression of the fleece takes place over the plane of the panel. The conical shape of the shaft formed by the circulating compression belts compresses the fleece within the perpendicular section of the shaft. Compression is important for chip orientation. In addition, the chips/fibers can be preoriented by precompression in the plane of the panel. Orientation is retained to a degree which increases directly with the cohesion of the mixture and inversely with the drop height. Subsequent compression over the panel plane considerably reinforces the alignment of the chips in the panel plane since the individual chips attempt to oppose the least resistance to compression. This chip orientation produces a high degree of bending strength at right angles to the panel plane. The conically convergent shaft section is followed by a section in which the compression belts run parallel to one another and are at a distance from one another corresponding to the thickness of the finished panel strand. The fleece is cured in the downstream calibrating press.

Another embodiment of the device according to the invention is also possible, such that the compression belts run parallel to one another in a first section and have a conical path with respect to one another in a second section. This design has the advantage that the angular adjustment of the compression belts is much simpler to execute when the second section runs horizontally.

According to another advantageous embodiment of the method, multilayer panels can be manufactured. This is accomplished by the simultaneous feeding of different or the same components into the perpendicular shaft. Equalization of the fleece supports the favorable chip orientation in the finished panel effectively.

It is also advantageous that not only panel-shaped materials can be manufactured but also materials with a three-dimensional shape. This can be accomplished, for example, by using a subdivided panel compression belt which is adjustable in segments. The process can be effectively reinforced by heaping the fleece into the desired shape.

According to another embodiment of the device, provision is made such that the slope angle as well as the distance between the compression belts with respect to one another is variable.

The compression belts can be equipped with devices that add or remove heat. It is advisable to cool the compression belts when the solubility of dihydrate to water is to be increased during the process.

Often it is necessary to use compression plates instead of compression belts. This is especially true when compression belts, because of their length and the precision of their manufacture, would be too expensive for a given installation.

Feeding the compression belts and compression plates alternately reinforces the feeding of the fleece into the press.

To ensure uniform addition of the mixture (or mixtures) into the press shaft, it is advantageous for the dispensing devices to oscillate over the width of the pile of mixture within the shaft during the pouring process.

According to another embodiment of the device, the mixtures can be spread directly on the compression belts and not into the shaft. This is especially advantageous when multilayer wooden materials are to be produced. In addition, a coating, a film for example, can enter the compression shaft on both sides or one side only, before compression with the fleece. It is also possible to apply a coating upstream of the calibration press, which then delivers the necessary pressure.

The device can be designed such that, when the system is started, a lowerable punch is inserted into the shaft (the shaft runs only perpendicularly) to keep the mixture from falling through. As the panel becomes increasingly solid, this punch can be lowered all the way.

DESCRIPTION OF THE DRAWING

These and further advantages of the invention are more readily understood with reference to the following description considered in conjunction with the accompanying drawings in which.

DESCRIPTION OF THE PREFERRED EMBODIMENT

Figure 1:
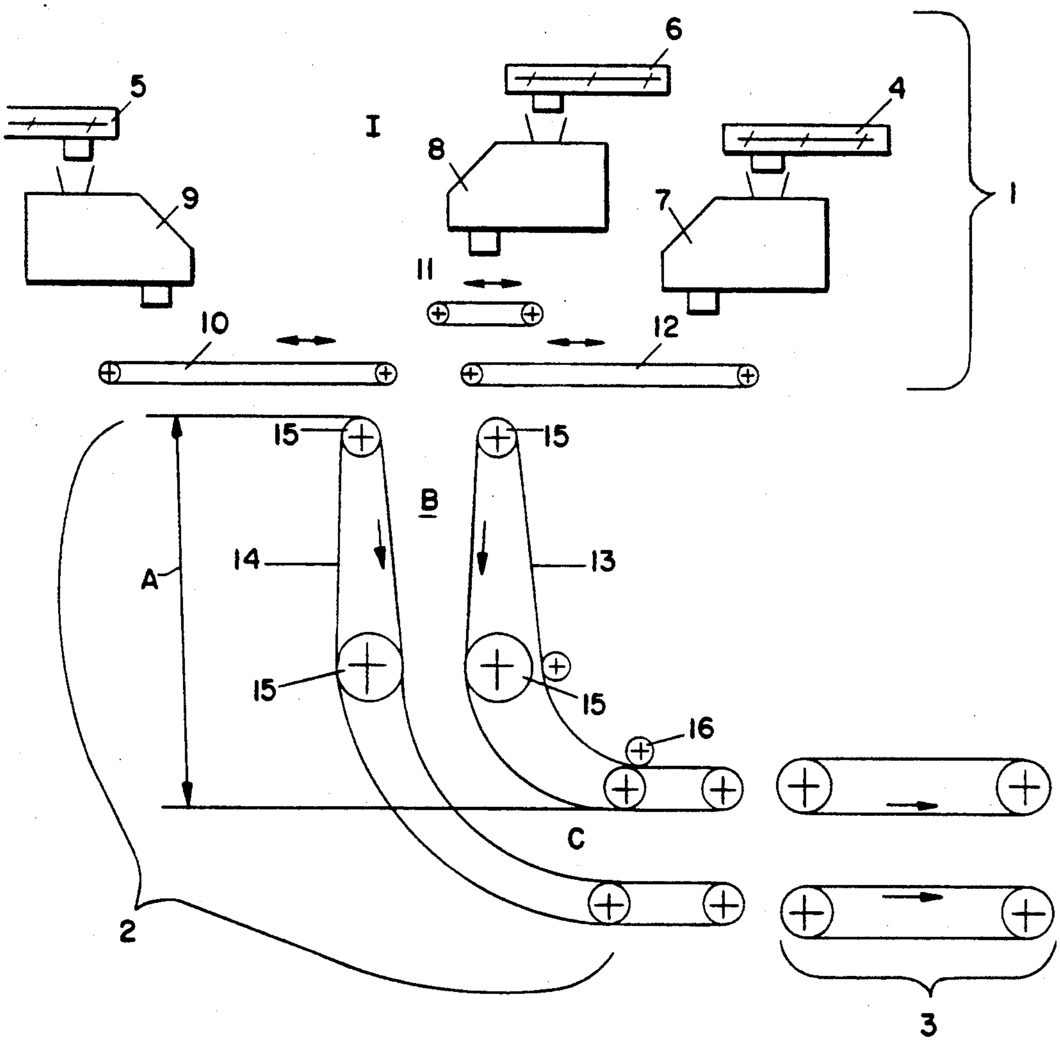
FIG. 1 is schematic diagram of an embodiment of a device constructed according to the invention wherein the mixtures are poured directly into the press shaft.

Referring to FIG. 1, one embodiment of the invention includes mixing and spreading devices 1, a compression assembly 2, and a calibration assembly 3. A mixture of wood chips and binders for the cover layers is created in intensive mixers 4 and 5, while the mixture for the middle layer is generated in intensive mixer 6. Spreading stations 7, 8, and 9 have the task of forming a uniform chip fleece on the downstream dispensing belts, 10, 11, and 12. The fleece thus formed is poured into the conical shaft formed by the circulating compression belts 13 and 14, with the position of dispensing belts 10, 11, and 12 (the arrows indicate the direction of travel of the dispensing belts) forming the respective layers. To ensure uniform addition of the mixture or mixtures into the press shaft, the dispensing belts may oscillate over the width of the shaft during the pouring process. Circulating compression belts 13 and 14, which run around rollers 15, also have support rollers 16. The length of vertical section A of conical shaft B can be dimensioned such that the deflection and hence the beginning of the parallel run of compression belts 13 and 14 coincides with the beginning of the stiffening of the mixture. The mixture added to the conical shaft is deflected during transport by the circulating endless compression belts 13 and 14. Hydration of the binder takes place in downstream calibrating press 3. The separation shown in this embodiment between the compression 2 and calibrating 3 presses is not absolutely necessary. These two presses can be surrounded by a single belt.

Mixing and dispensing device 1 can also consist of a mixer, for example, mixer 8 and only one dispensing belt, for example, dispensing belt 11, which oscillates around the midline of the shaft.

Figure 2:
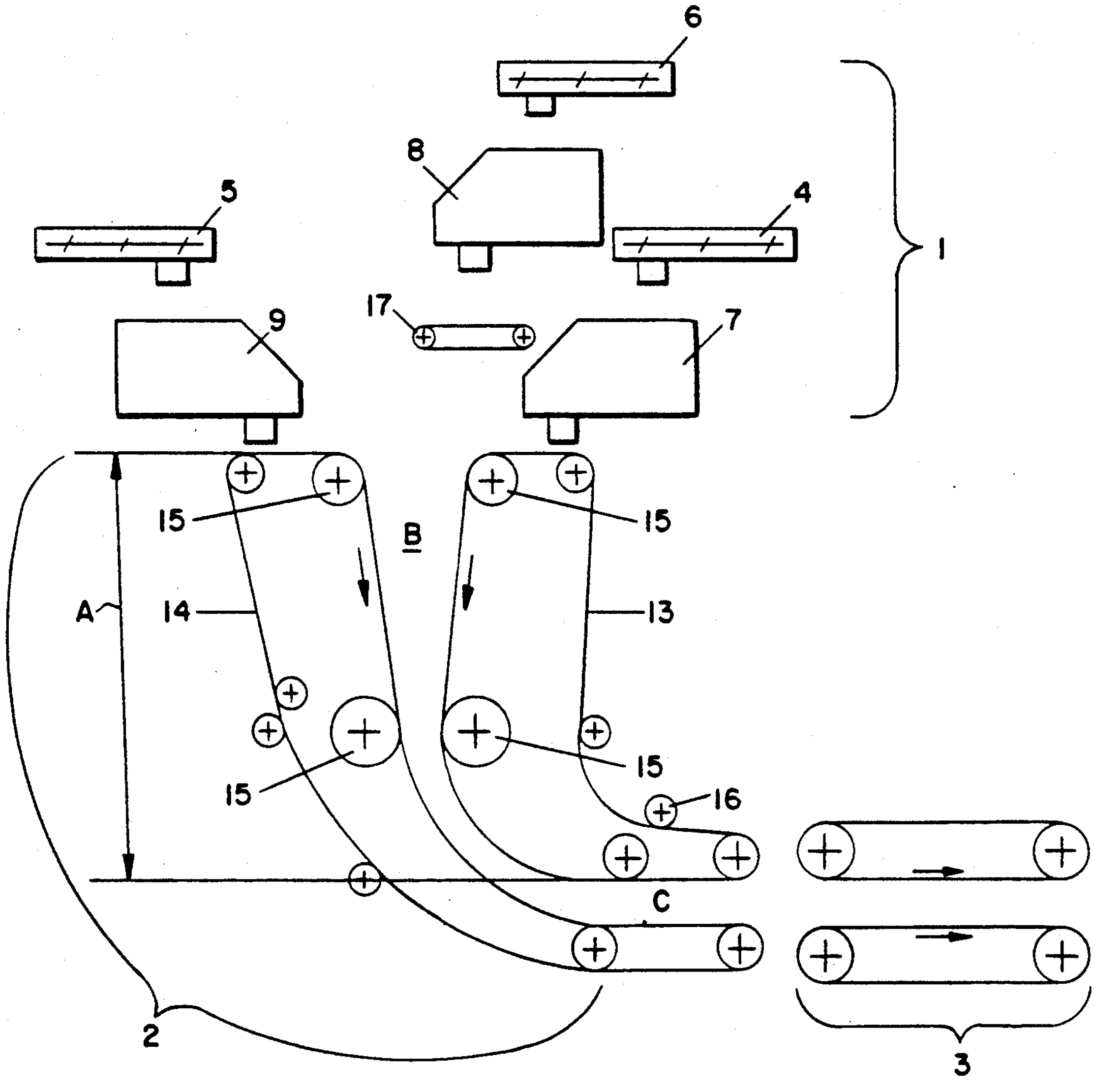
FIG. 2 is a schematic diagram of another embodiment of a device constructed according to the invention wherein the mixture is spread onto the compression belts.

FIG. 2 shows another embodiment of a device constructed according to the invention, in which compression belts 14 and 13 are guided in their upper area adjacent the dispensing and mixing station 1, over two rollers 15 so that they form a surface for the spreading of the fleece. This design is especially suitable for manufacturing multilayered panels, especially when an additional dispensing belt 17 is provided by means of which a third component of the mixture, poured into the middle of shaft B, can be added.

The system always started only when the vertical shaft is filled and the compression belts or compression plates remain at rest until the shaft is full.

Figure 3:
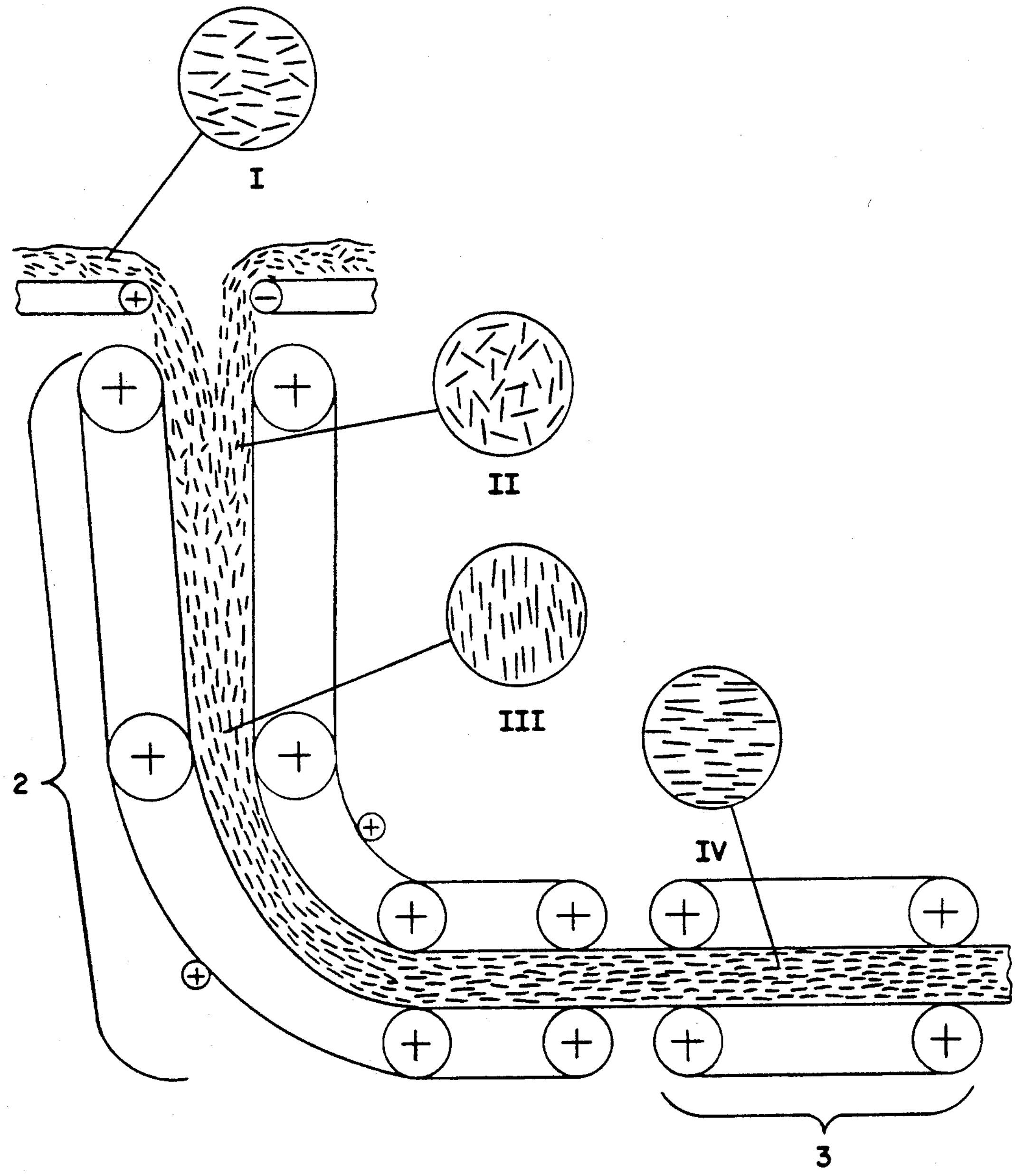
FIG. 3 is a schematic diagram of the embodiment of the invention shown in FIG. 1 indicating the chip/fiber orientation during the pressing process and in the finished panel.

FIG. 3 shows the embodiment of the invention shown in FIG. 1 in operation. The mixture, I, initially contains a distribution of particles in which the alignment and spacing of the particles relative to each other is not uniform. As the two streams of particles interact, the orientation of the particles becomes random, II. As the particles are subjected to pressure, their spacing decreases and they become aligned, III. The particles within the panel being cured retain this alignment, IV.

Figure 4:
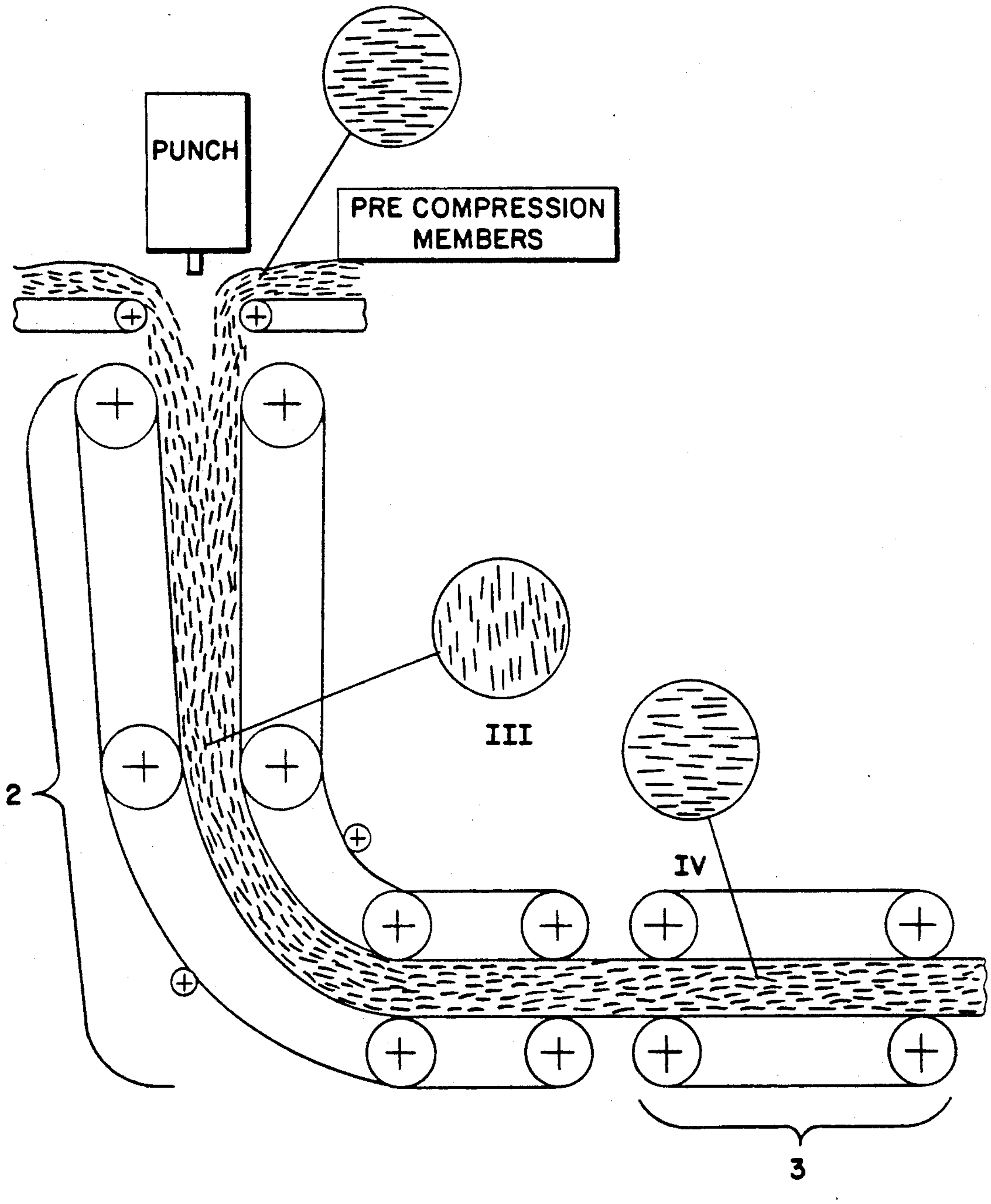
FIGS. 4, 4A and 4B are schematic diagrams of alternatives to the embodiment of the invention illustrated in FIG. 1.
Figure 4A:
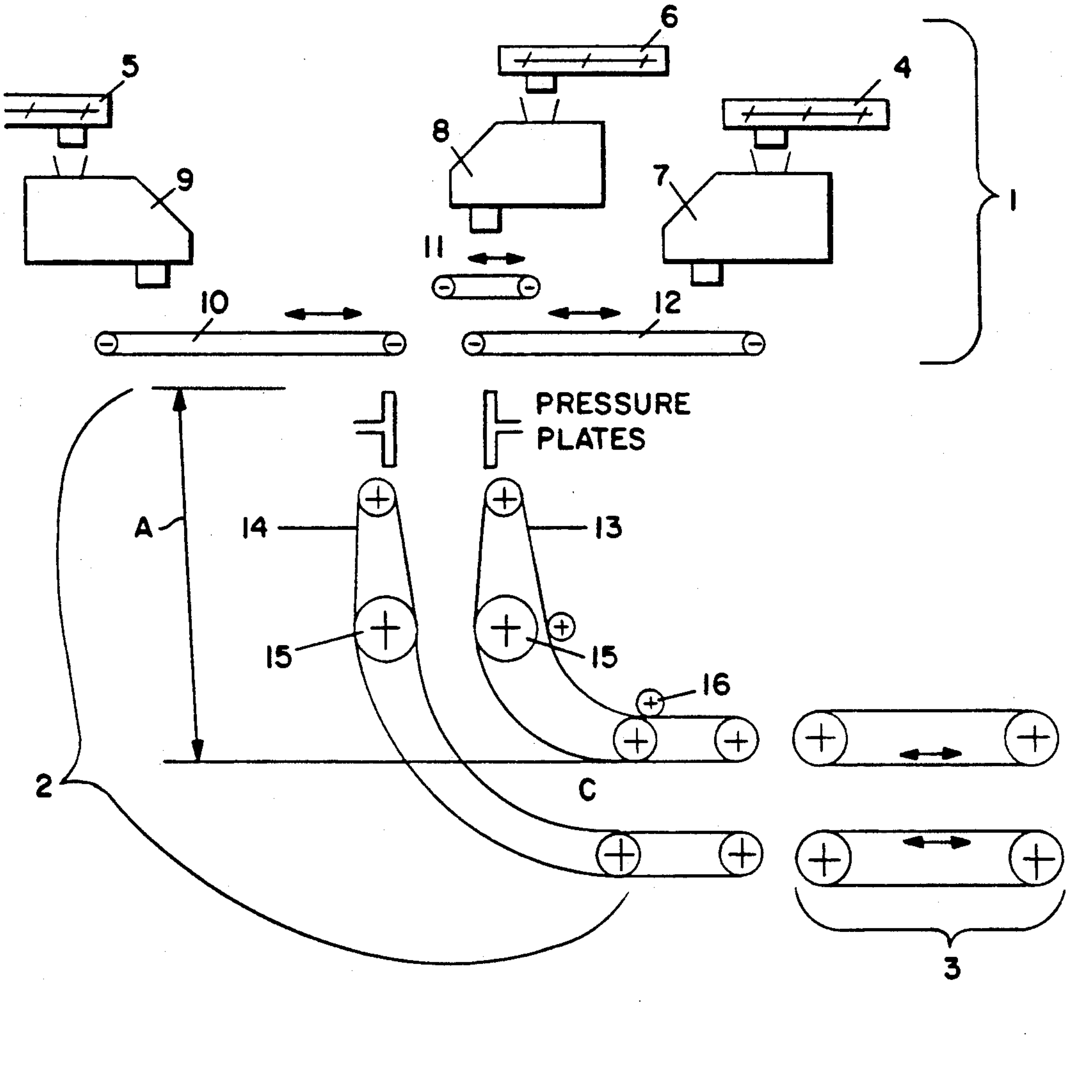
Figure 4B:
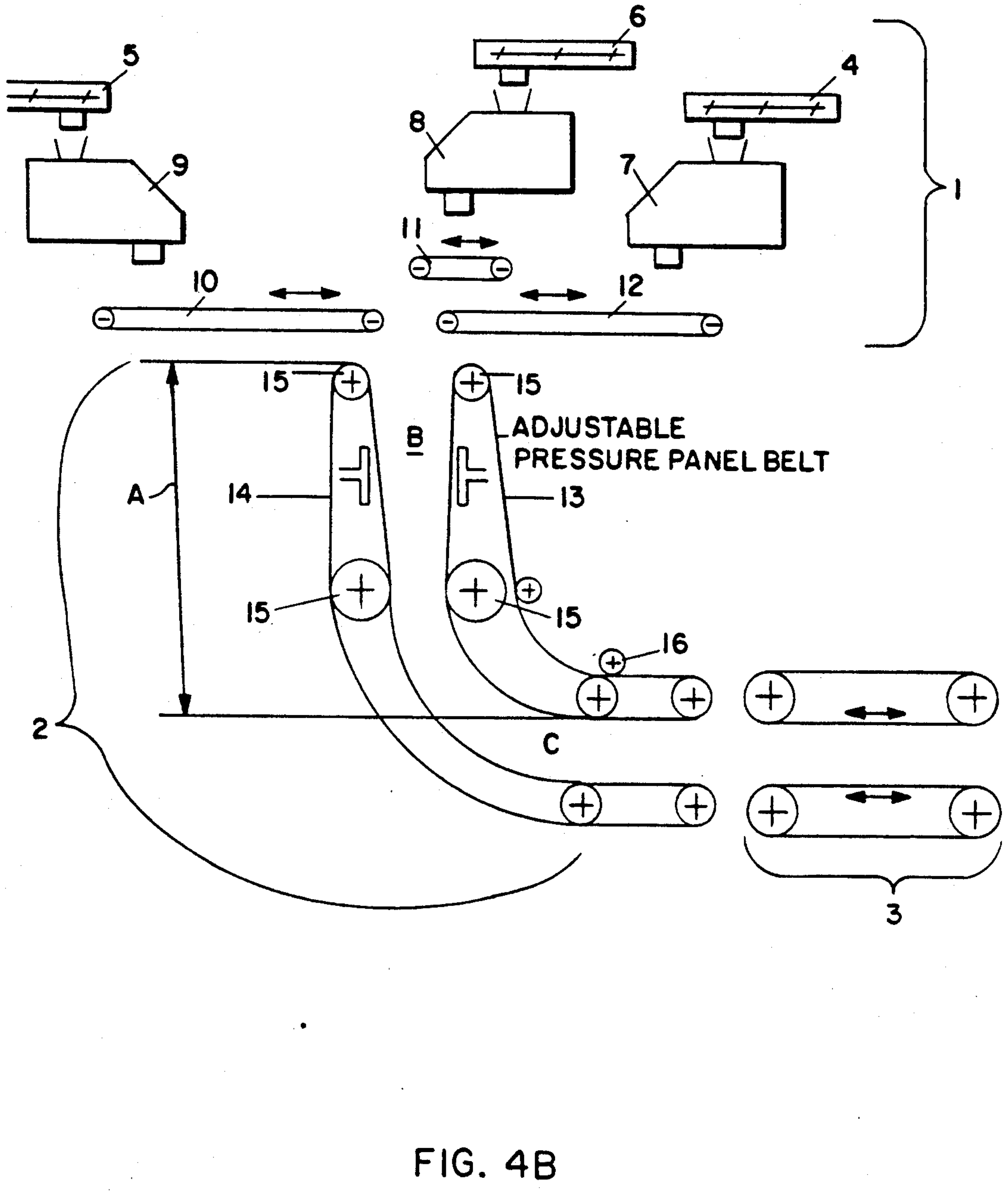

FIG. 4 shows an embodiment of the device in which a lowerable punch is insertable into the shaft and precompression members are used. FIG. 4A shows an embodiment of the device in which pressure plates are used as compression members. FIG. 4B shows an embodiment of tl device which uses an adjustable pressure panel belt.

The advantage of the method according to the invention includes the fact that the parallel arrangement of the mixing and spreading assembly 1 allows binders with very short hydration times to be processed so that the length of a calibrating press 3 can be considerably reduced. For example, we have provided an estimate of the necessary length of a calibration section when the compression belt speed is 5 meters per minute. A total of 70 seconds is estimated for the mixing and spreading process. With a press height of 3 m and a length of 2 m, the travel time is 60 seconds. The sum of the two times gives the earliest time at which hydration must start ($H_B$=start of hydration=130 seconds). Past experience indicates that the total hydration time is about 2 to 3 times $H_B$ and in this case 390 seconds. Calibration time is therefore 260 seconds (390−130=260). Hence the calibrating press must be about 22 m long with a feed rate of 5 m per minute. In comparison to ordinary calibrating presses whose length is about 50 m, this means a considerable reduction in structural length with the same capacity. The savings achieved with such a system are considerable.

What is claimed is:

1. A flat extrusion method for manufacturing panels made with a mixture of inorganically or organically bonded wooden materials comprising the steps of:

a) simultaneously feeding the mixtures through mixing and spreading devices (1) into a perpendicular conically tapered shaft (A, B) formed by circulating compression belts (13, 14) said spreading and mixing device including at least one dispensing device that oscillates substantially around the midline of the conical shaft when the mixture is poured into the conical shaft, said dispensing device adding a component to the mixture;

b) compressing the mixture by the conical design of shaft (B) and the subsequent travel through a section (C) in which the compression belts are arranged parallel to one another and are at a distance from one another that corresponds to the thickness of a finished panel strand; and c) curing the mixture in a downstream calibration section (3).

2. Method according to claim 1, wherein multilayer panels are manufactured by simultaneous spreading of component materials of a similar type.

3. Method according to claim 2 wherein components are being added equally to the shaft (A, B).

4. Method according to claim 1, wherein by using a subdivided pressure panel belt which is adjustable in segments as the circulating compression belt, shaped parts with three-dimensional shapes can be produced.

5. Method according to claim 3 wherein the components are poured to correspond to the desired shape.

6. A device for the continuous manufacture of composite panels from an organically or inorganically bonded mixture of wooden material comprising:

a spreading and mixing device being arranged such that simultaneous spreading and mixing of the mixture is ensured;

compression members for receiving the mixture from the spreading and mixing device, the compression members comprising, a first section (A) in which the compression members are arranged perpendicularly with respect to said spreading and mixing device and are tilted with respect to one another to form a conical shaft (B) that tapers in the direction of travel of the panel being formed and in which compression of the mixture added thereto takes place, said spreading and mixing device including at least one dispensing device that oscillates substantially around the midline of the conical shaft when the mixture is poured into the conical shaft, said dispensing device adding a component to the mixture; and a second section (C), in which the compression members (13, 14) run parallel to one another approximately from a position at which the start of setting of the mixture occurs, a distance between the compression members being the required panel thickness; and a calibrating device (3) adjacent said second section.

7. A device for the continuous manufacture of composite panels of an organically or inorganically bonded mixture of wooden materials comprising:

a spreading and mixing device being arranged such that simultaneous spreading of the mixture is ensured;

circulating compression belts positioned to receive the mixture from the spreading and mixing device, the circulating compression belts comprising, a first section in which compression belts (13, 14) are arranged substantially coaxially and run parallel to one another; and a second section in which compression belts (13, 14) run conically with respect to one another to form a conical shaft at a first end of said second section, a distance between the compression belts (13, 14) at a second end of said second section corresponding to the required panel thickness, said spreading and mixing device including at least one dispensing device that oscillates substantially around the midline of the conical shaft when the mixture is poured into the conical shaft, said dispensing device adding a component to the mixture; and a calibrating device (3) adjacent said first section.

8. The device according to claim 6 wherein the slope angle and spacing of the compression members (13, 14) with respect to one another is adjustable.

9. The device according to claim 8 wherein the compression members (13, 14) are provided with thermal devices.

10. The device according to claim 9, wherein the compression members (13, 14) are guided over rollers (15).

11. The device according to claim 6 wherein said compression members include pressure plates.

12. The device according to claim 6 wherein the compression members (13, 14) are fed alternately.

13. The device according to claim 6 wherein the spreading device has material-guiding members for the manufacture of multilayer panels.

14. The device according to claim 6 wherein the compression members (13, 14) are positioned such that pouring takes place directly thereon.

15. The device according to claim 6 wherein the mixtures spread on the compression members (13, 14) are precompressed by precompressing members such that the chip orientation is determined by the spreading.

16. The device according to claim 6 wherein compression members (13, 14) run perpendicularly in their parallel segment (C) and wherein a punch inserted in the shaft (A, C) is lowered hydraulically as pouring progresses.

17. The device according to claim 9 wherein the thermal device adds heat.

18. The device according to claim 9 wherein the thermal device removes heat.

* * * * *